Patented Jan. 28, 1930

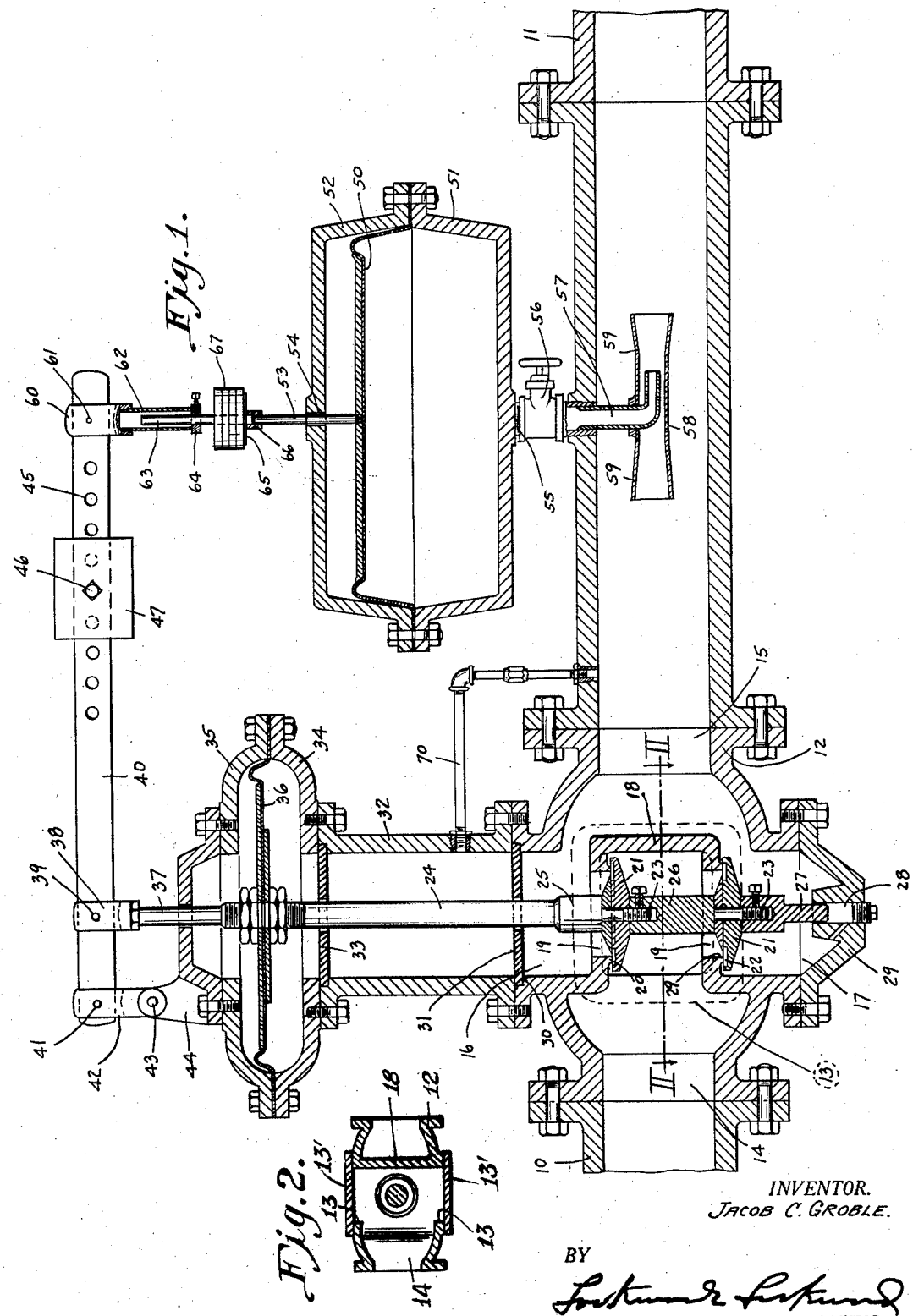

1,745,256

UNITED STATES PATENT OFFICE

JACOB C. GROBLE, OF ANDERSON, INDIANA

FULL AUTOMATIC DEMAND FLUID-PRESSURE REGULATOR

Application filed May 14, 1926. Serial No. 109,018.

This invention relates to an automatic substantially continuous pressure control for fluid supply lines.

The chief object of this invention is to maintain a pressure in a fluid supply line sufficient to maintain a substantially constant pressure at all of the consuming stations independently of the demands of each or the total demand at any given time.

The chief feature of the invention consists in controlling the reducing valve in the fluid supply line automatically for maintaining sufficient pressure on the low pressure side of the valve, whereby substantially constant pressure is available to each of the consuming demands connected with the supply line, and said control is effected through the velocity of the fluid in the supply line, said velocity being proportional to the demand, whereby if the demand increases the velocity increases, which velocity pressure through suitable control means, operates the reducing valve to increase the pressure on the low pressure side of the supply line and thus reduces the velocity to that predetermined velocity which maintains a constant pressure upon the consuming demand connected with the low pressure fluid supply line.

Another feature of the invention consists in the provision of two pressure chambers mechanically connected together, one of which is connected to the reducing valve and the other of which is connected to the velocity responsive device so that the velocity responsive device automatically controls the reducing valve.

Another feature of the invention consists in the adjustable mountings of the various parts and the elimination or prevention of built up or velocity head pressures which otherwise would effect the control.

The full nature of the invention will be understood from the accompanying drawing and the following description and claims.

Figure 1 of the accompanying drawing illustrates in central section and elevation the reducing valve of a fluid pressure supply line and the velocity control therefor with the intermediate connections.

Figure 2 is a sectional view taken on the line II—II of Figure 1 looking downwardly and drawn to a reduced scale.

In the drawings 10 indicates a relatively high pressure supply main and 11 a relatively low pressure supply main to which is connected the several fluid consuming demands. Such a system is to be found in gas mains where heat and illuminating gas is supplied to a community. A reducing valve 12 is interposed between the pipes 10 and 11 and includes hand hole openings 13 covered by detachable plates 13' (Figure 2) shown dotted and the opposite openings 14 and 15, the former constituting the intake and the latter the outlet. The valve body also includes the transversely positioned openings 16 and 17, said openings being in alignment with each other. A partition in the form of a U-shaped wall 18 includes the two openings 19 in alignment with each other, having the seats 20 associated with each of the valve openings 19. Adjacent each seat 20 is a valve 21 having the sealing cushion 22 for seat engagement. Each valve 21 is adjustably mounted on a threaded stem 23 and the uppermost stem 23 is a continuation of the rod 24 having the enlargement 25 which limits the position of the upper valve. The threaded stem 23 of the rod 24 carries an extension 26 which has a similar portion 23 for receiving the lower valve 21 and upon this extension is another extension having the reduced guide portion 27 receivable by the opening 28 formed in closure plate 29 for the lowermost opening 17. Thus, a balanced reducing valve is formed.

Removal of plate 29 permits removal of the guide extension 27 and lower valve 21. The upper valve 21 and extension 26 may be removed through either of the hand hole openings 13 after extension 26 is detached and the plates 13' are removed (Figure 2). The upper opening flange 16 is recessed at 30 to receive a plurality of radially inwardly extending rod engaging guides 31. Said guides are retained by tubular extension 32 which also carries at its opposite end additional guides 33. Axial movement of the stem and valve is thereby positively assured since the guide opening 28 is also in alignment.

Tubular extension 32 terminates in a diaphragm chamber 34 which is closed by a cover portion 35, and between the same main diaphragm 36 is adjustably supported upon the rod 24. An extension 37 of said rod 24 terminates in a yoke 38 pivotally mounted at 39 upon a lever 40 pivotally mounted at 41 upon a link construction 42, in turn pivotally mounted at 43 upon an ear construction 44 carried by the reducer valve casing. The aforesaid connection insures straight line movement of the stem 24 when the lever 40 is tilted upon its pivotal support. The lever arm 40 is provided with a plurality of adjustments in the form of openings 45 to receive the adjusting bolt 46 for securing weight 47 upon the arm 40. Weight 47 tends to lower rod 24 and open the valves. The pressure supplied through pipe 10 passes upwardly into the tube 32 and thence into the diaphragm chamber 34 and builds up therein to oppose and balance the weight.

With the aforesaid balanced reducing valve considerable pulsating occurs by reason of the variation in the demand. If it is assumed that a predetermined minimum pressure is to be maintained upon the low pressure fluid supply line, then when the demand comes on such a line the pressure may fall to such a degree that unsatisfactory operation of the fluid consuming devices occurs. The low pressure supplied thereupon must be increased. If the reducer valve is arranged to secure a pressure sufficient to take care of the estimated maximum or normal maximum demand, then during such times as there is no maximum demand, the pressure is excessive and leakage loss is excessive.

The means for automatically varying the control of the reducing valve, consists of a master diaphragm 50 secured in the chamber 51—52 and provided with the stem 53 slidably supported in opening 54 of member 52. Outlet 55 controlled by valve 56 communicates with an angular tube 57 that is radially and then axially positioned with respect to the low pressure supply line 11 and constitutes a velocity jet. To insure the satisfactory jet operation there surrounds the angular end thereof an intensifier in the form of a tubular jet having its opposite ends flared as at 59. As the velocity in pipe 11 increases by reason of the increased demand of the fluid consuming demand connected thereto, the angular tube 57 is subjected to increased suction intensified by venturi 58—59 which reduces the pressure in the chamber containing master diaphragm 50. Stem 53 falls with the diaphragm. The connection between stem 53 and lever 40 is as follows: Yoke 60 pivotally supported at 61 at or near the end of the lever 40 includes a depending tubular portion 62. Slidable within the tubular portion 62 is stem 63 carrying a collar 64 adjustably mounted thereon, plate 65, and the tubular guide 66. Plate 65 supports weights 67 as is customary in similar supports.

As the pressure increases in the master chamber (controlled by diaphragm 50) rod 53 and rod 63 rise in opposition to weight 67 and elevate the lever 40 in opposition to weight 47. The effect of this then is to reduce the load on the lever arm 40, which, through the diaphragm 36, shuts the valve in proportion to the amount of unloading. Upward movement of stem 63 is limited by collar 64 which serves as a stop. When the pressure in the master chamber (controlled by diaphragm 50), is reduced by reason of increased demand it is expressed through increased velocity upon the velocity jet. Increased suction lowers the rod 53 and diaphragm 50 and the stem 63 follows therewith and also the lever arm 40. The movement continues proportional to the increasing velocity until a balance is obtained. The continued opening of the valve 21 accompanies this movement until such time as the balance is obtained. When sleeve 66 abuts the top of the master diaphragm chamber 52 maximum valve opening is obtained. As the demand decreases pressure builds up in the master or low pressure chamber closed by diaphragm 50 which automatically closes valves 21 to the same extent.

The foregoing constitutes the automatic control. To insure substantially absolute proportional operation, the bleeder or by-pass 70 is provided. This has one end in substantially free communication with the main pressure chamber controlled by diaphragm 36 and its opposite end with the low pressure line. The result is an equalization of pressure so that the pressure in the main pressure chamber is substantially equal to that in the low pressure line. Such is not the case generally when the aforesaid by-pass is not included, since when there is a large demand, a large volume of fluid passes through the reducing valve and this with the accompanying increased velocity builds up pressure in the main pressure chamber slightly in excess of the pressure at the intake end of the low pressure line. The by-pass equalizes these pressures or prevents building up additional pressure.

From the foregoing it will be understood, therefore, that the control for the main or reducing valve is automatic in operation. It is not susceptible to errors through the inherent operating characteristics of the mechanism employed. It requires no additional source of energy other than the passage of the fluid from the high pressure line to the low pressure line for operation. Furthermore, no long connections, transmission lines or the like, or equivalent, are required since the velocity jet should be positioned immediately adjacent the reducing valve for operation so that the full effective velocity due to the total demand at any instant, is operative on the main valve to secure the desired pressure reduction from the high pressure to the low pressure line. The device after being adjusted to the desired limits, said adjustment being secured by positioning the weight 47 in the desired position and by the addition of the weights 67 and the positioning of the collar 64 is automatic, requires no further attention, and is entirely self contained or cylic.

The invention claimed is:

1. In a fluid pressure regulating system, a high pressure main, a low pressure main, a pressure regulating valve interposed between and connecting said mains, pressure responsive means for controlling said valve, a pressure chamber disposed between said means and said low pressure main, a second pressure responsive means connected to said low pressure main, means connecting said two pressure responsive means together for controlling said reducing valve, a by-pass between said pressure chamber and said low pressure main for aiding in preventing dead fluid pockets from forming in said chamber, and flow responsive means positioned within said low pressure main and directly in the path of the flowing fluid for controlling said second pressure responsive means, said flow responsive means serving to increase the opening of said pressure reducing valve with an increase in the kinetic head of the fluid in the low pressure main and said by-pass tending to augment the equalization of pressures in said chamber and low pressure main with an increase in fluid flow, said flow responsive means including a flared and Venturi-like tube disposed in said low pressure main and an angular nozzle connected to said second pressure responsive means and extending into said tube and having its discharge end pointed in the direction of the fluid flow.

2. In a fluid pressure regulating system, a high pressure main, a low pressure main, a pressure regulating valve interposed between and connecting said mains, pressure responsive means for controlling said valve, a pressure chamber disposed between said means and said low pressure main, a second pressure responsive means connected to said low pressure main, means connecting said two pressure responsive means together for controlling said reducing valve, and flow responsive means positioned within said low pressure main and directly in the path of the flowing fluid for controlling said second pressure responsive means, said flow responsive means serving to increase the opening of said pressure reducing valve with an increase in the kinetic head of the fluid in the low pressure main and including a flared and Venturi-like tube disposed in said low pressure main and an angular nozzle connected to said second pressure responsive means and extending into said tube and having its discharge end pointed in the direction of the fluid flow.

3. In a fluid pressure regulating system, a high pressure main, a low pressure main, a pressure regulating valve interposed between and connecting said mains, pressure responsive means for controlling said valve, a pressure chamber disposed between said means and said low pressure main, a second pressure responsive means connected to said low pressure main, means connecting said two pressure responsive means together for controlling said reducing valve, and flow responsive means positioned within said low pressure main and directly in the path of the flowing fluid for controlling said second pressure responsive means, said flow responsive means serving to increase the opening of said pressure reducing valve with an increase in the kinetic head of the fluid in the low pressure main, said means for connecting said two pressure responsive means including a one-way motion connection associated with said second pressure responsive means.

In witness whereof, I have hereunto affixed my signature.

JACOB C. GROBLE.